United States Patent [19]

Herrington et al.

[11] Patent Number: 4,711,056
[45] Date of Patent: Dec. 8, 1987

[54] ABRASIVE FLUID JET RADIUS EDGE CUTTING OF GLASS

[75] Inventors: Richard A. Herrington, Walbridge; Thomas G. Kleman, Graytown; Ermelinda A. Apolinar, Toledo, all of Ohio

[73] Assignee: Libbey-Owens-Ford Co., Toledo, Ohio

[21] Appl. No.: 930,957

[22] Filed: Nov. 12, 1986

Related U.S. Application Data

[63] Continuation of Ser. No. 776,377, Sep. 16, 1985, abandoned.

[51] Int. Cl.$^4$ ............................. B24C 5/04; B24C 1/00
[52] U.S. Cl. ........................................ 51/410; 51/321; 51/439
[58] Field of Search ................. 51/410, 319, 320, 321, 51/326, 415; 83/53, 177; 239/1

[56] References Cited

U.S. PATENT DOCUMENTS

| | | | |
|---|---|---|---|
| 2,985,050 | 5/1961 | Schwacha | 51/410 |
| 3,524,367 | 8/1970 | Franz | 51/321 |
| 3,888,054 | 6/1975 | Maselli | 51/319 |
| 4,449,332 | 5/1984 | Griffiths | 51/439 |
| 4,478,368 | 10/1984 | Yie | 51/439 |
| 4,545,157 | 10/1985 | Saurwein | 51/439 |

FOREIGN PATENT DOCUMENTS 0119338  9/1984  European Pat. Off. .............. 83/177

OTHER PUBLICATIONS

"Abrasive Jet Machining"; *The Tool and Manufacturing Engineer;* Ingulli; Nov. 1967.

Primary Examiner—Frederick R. Schmidt
Assistant Examiner—Robert A. Rose
Attorney, Agent, or Firm—Marshall & Melhorn

[57] ABSTRACT

Producing a radius or curved edge in cutting glass by means of a high pressure abrasive fluid jet. Abrasive particles are aspirated in carefully controlled amounts into a fluid stream which is directed through a nozzle tube having an elongated passageway of small diameter, and the fluid is discharged against and closely adjacent the surface of the glass as a highly collimated jet carrying the abrasive particles. The passageway gradually increases in diameter, or flares outwardly, at the discharge end of the nozzle tube, allowing the collimated stream to diverge within confined limits immediately prior to impinging upon the glass surface. The abrasive particle-containing conical fluid jet cuts through the glass along the path followed by the axis of the nozzle tube, while the glass to either side of the cut is abraded by progressively decreasing amounts toward the lateral extremities of the fluid jet. The glass cut is thus formed with a curved edge on the entrant side of the cut. The glass may be similarly treated from the opposite direction by the abrasive jet to produce a completely rounded edge.

19 Claims, 4 Drawing Figures

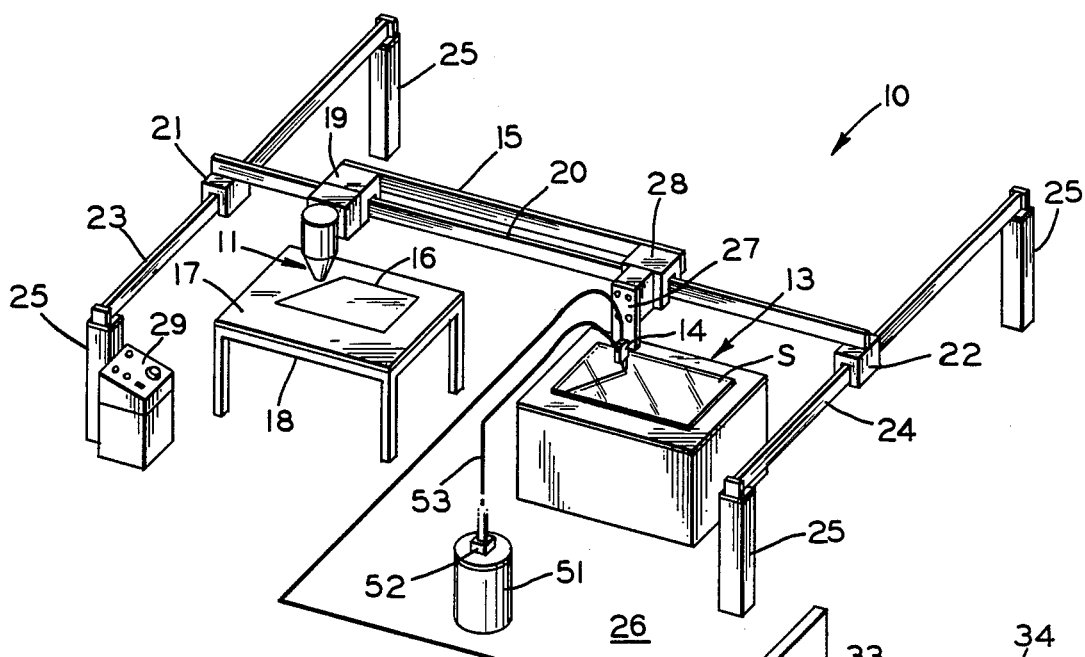
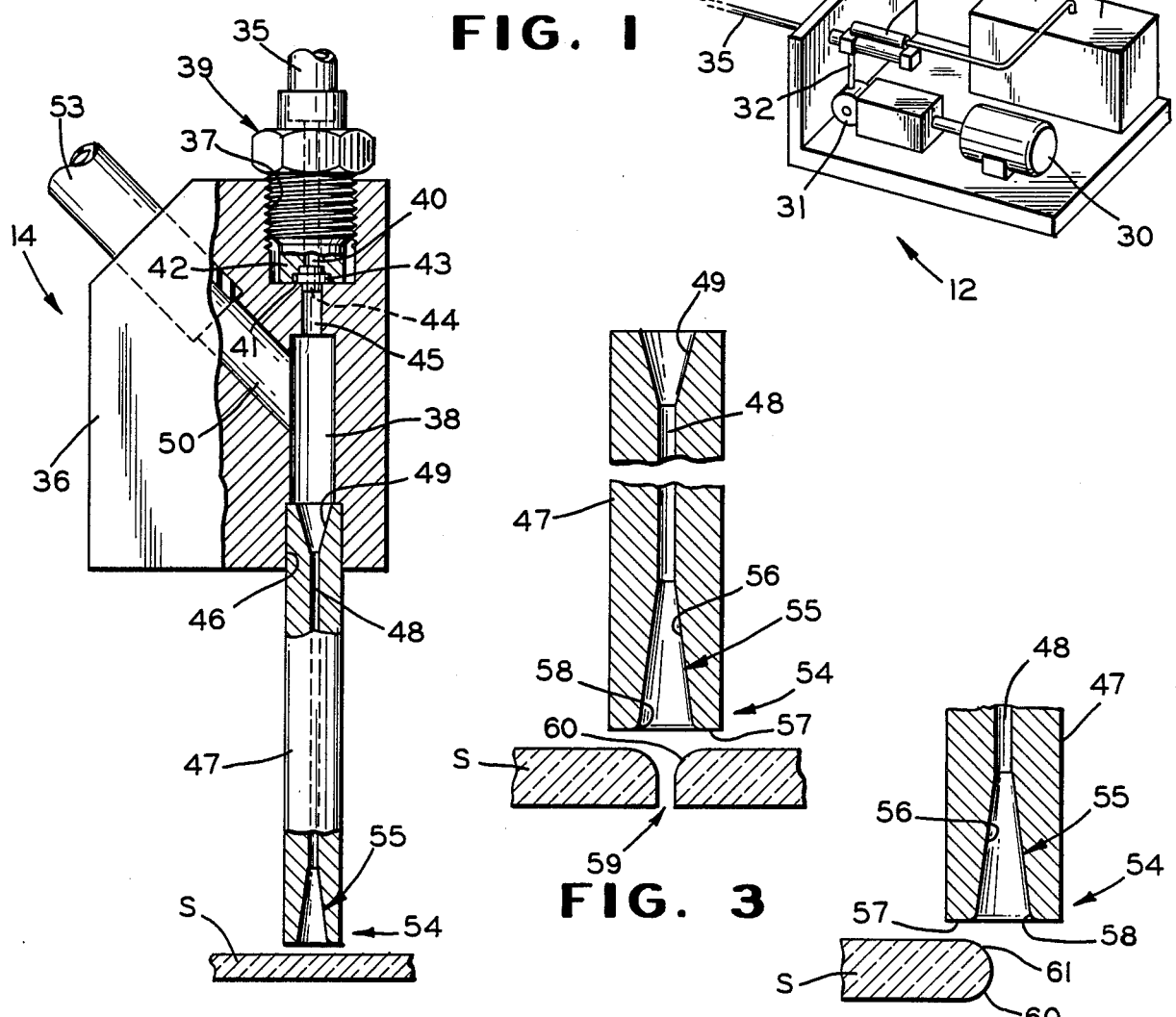
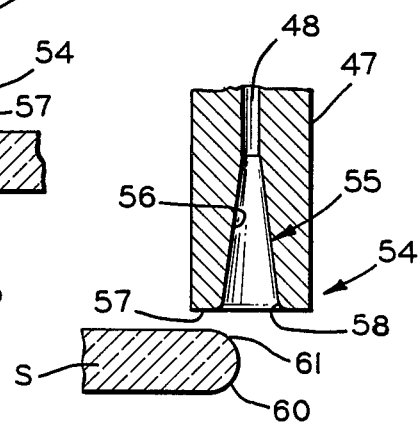
FIG. 1
FIG. 2
FIG. 3
FIG. 4

ABRASIVE FLUID JET RADIUS EDGE CUTTING OF GLASS

CROSS REFERENCE TO RELATED APPLICATIONS

This is a continuation of application Ser. No. 776,377, filed Sept. 16, 1985, now abandoned.

BACKGROUND OF THE INVENTION

1. Field of the Invention

The present invention pertains generally to the cutting of glass by means of an abrasive fluid jet, and more particularly to the formation of a rounded or so-called radius edge on the glass as it is cut by the abrasive fluid jet.

2. Description of the Prior Art

Flat glass has conventionally been cut or severed by scoring a surface of the glass sheet and then flexing the glass along the score line to cause it to fracture therealong. Such a procedure generally results in a raw glass edge having sharp corners which are not only aesthetically objectionable but also in many instances unsuitable for subsequent fabricating processes. Consequently it may be necessary to subject the raw glass edge to an additional edging step wherein the glass edge is rounded or ground off as with abrasive belts. Such a step, of course, adds considerably to the cost of fabricating the finished glass part. More recently glass has been advantageously cut employing a high pressure abrasive fluid jet. Such a procedure has been found particularly advantageous in cutting so-called heavy glass and in cutting intricate patterns from a glass blank. While the techniques employed heretofore in abrasive fluid jet cutting of glass generally produce cut edges of much higher quality than those produced by the aforementioned scoring and flexing technique, the resulting edges are planar so that a distinct line is created along the intersection of the cut edge with the major surfaces of the glass sheet, and the sheet has a square edge generally normal to the major surfaces of the sheet. Such an edge configuration may not be suitable in many instances for subsequent fabricating steps or for many end uses of the sheet. Thus, it may again be necessary to subject the cut edge to additional edging or seaming as with an abrasive belt to round off the edge and eliminate either one or both of the distinct lines or corners along the intersection of the edge with the major surfaces of the sheet.

SUMMARY OF THE INVENTION

In accordance with the present invention there is provided a high pressure abrasive fluid jet cutting system for glass which produces a radius or curved configuration along the entrant edge of the cut. In cutting glass by means of an abrasive fluid jet, abrasive particles are aspirated in carefully controlled amounts into a fluid stream directed against the glass under high pressure. The fluid is directed through a nozzle tube having an elongated passageway of small diameter so as to be discharged closely adjacent the surface of the glass in a highly collimated stream or jet containing the abrasive particles. The passageway gradually increases in diameter, or flares outwardly, at the discharge end of the nozzle tube. The collimated stream carrying the entrained abrasive particles thus tends to diverge somewhat immediately prior to impinging upon the glass surface. Due to the inverted conical configuration of the stream, the greatest concentration of entrained abrasive particles impinges upon the glass along the path followed by the axis of the nozzle tube in moving along the glass, while the concentration of abrasive particles decreases toward the lateral sides of the stream. The abrasive fluid jet thus makes a narrow cut through the glass along the aforementioned path, with the glass to either side of the cut being abraded by a progressively reduced amount toward the lateral extremities of the stream. The cut surface is thus formed with a curved edge on the side from which the abrasive jet is directed. By similarly directing the abrasive jet against the sheet in the opposite direction, there is formed a curved edge similar to the so-called automotive edge created by seaming a conventionally cut edge with abrasive belts.

It is, therefore, a primary object of the invention to produce a curved or rounded edge on glass cut by an abrasive fluid jet.

Another object of the invention is to avoid overspray of the abrasive fluid onto the adjacent main body portion of the glass in producing such a rounded edge.

Another object of the invention is to provide a nozzle tube for abrasive fluid jet cutting of glass wherein the fluid jet expands conically immediately prior to impinging upon the glass surface.

Still another object is to provide apparatus for abrasive fluid jet cutting of glass wherein a rounded cut edge is formed with the discharge end of the nozzle tube closely adjacent the glass surface.

Other objects and advantages will become more apparent during the course of the following description when taken in connection with the accompanying drawings.

BRIEF DESCRIPTION OF THE DRAWINGS

In the drawings, wherein like numerals refer to like parts throughout:

FIG. 1 is a schematic perspective view of a system for cutting glass in accordance with the invention;

FIG. 2 is an enlarged side elevational view, partly in section, of a jet nozzle assembly for cutting glass by means of an abrasive fluid jet in accordance with the invention;

FIG. 3 is an enlarged fragmentary sectional view of the discharge end of the nozzle tube and glass sheet following cutting by the abrasive fluid jet; and FIG. 4 is an enlarged fragmentary sectional view of the discharge end of the nozzle tube positioned for rounding the corner of the opposite surface of a glass sheet cut as in FIG. 3.

DESCRIPTION OF THE PREFERRED EMBODIMENTS

Referring now to the drawings, there is illustrated schematically at 10 in FIG. 1 a system which may be employed in radius edge cutting of glass sheets in accordance with the invention. More particularly, the system is adapted for cutting glass sheets or blanks along prescribed lines of any preferred configuration with the cut edge being formed with a curved corner at the entrant side, and includes an optical tracer 11 and an abrasive fluid jet cutting apparatus, generally designated 12. The cutting apparatus 12 includes a support stand 13 adapted to firmly support a glass sheet S as on a sacrificial support plate for cutting as will be hereinafter more fully described. While the illustrated system represents a preferred embodiment for practicing the invention, it will be readily appreciated the invention is not limited to use with such a system but also has utility with other and different equipment.

As best shown in FIG. 1 the fluid jet cutting apparatus 12 includes a discharge or nozzle assembly 14 to be hereinafter more fully described, mechanically interconnected to the optical tracer 11 by means of a tie bar 15. The tracer is provided for guiding the movement of the nozzle assembly 14 in accordance with a template or pattern 16 on a plate member 17 mounted on a table 18. The optical tracer 11 is affixed to a carriage 19 slidably mounted on an elongated transverse track 20 which is provided at its opposite ends with a pair of carriages 21 and 22. The carriages are slidably mounted on parallel tracks 23 and 24, respectively, supported by stanchion members 25 on a floor 26. The nozzle assembly 14 is affixed as by a plate 27, to a carriage 28 also slidably mounted on the transverse tract 20. The carriage 28 is rigidly connected in spaced relationship to the carriage 19 by the tie bar 15, with the spacing between the carriages 19 and 28 being such that the optical tracer 11 and the nozzle assembly 14 overlie the plate 17 and the support stand 13, respectively.

With the above described carriage system the tracer 11 is capable of movement in any direction longitudinally, laterally, or combinations thereof, with the carriage 28 and nozzle assembly 14 following the same motion due to the interconnection of the carriages 19 and 28 by the tie bar 15 and the track 20. Thus, as the tracer 11 follows the outline of the template or pattern 16, the fluid jet cutting nozzle 14, by virtue of its association with the carriage 28, is caused to move correspondingly over the support stand 13 and the glass sheet S thereon. Operation of the tracer functions, such as power on/off, speed, automatic and manual operation, etc., may be controlled as from a conveniently located control panel 29.

The fluid jet cutting apparatus itself, as shown schematically in FIG. 1, includes an electric motor 30 driving a hydraulic pump 31 which, in turn, supplies working fluid through a conduit 32 to a high pressure intensifier unit 33. The intensifier unit 33 functions to draw in fluid (for example, deionized water) from a suitable source such as a reservoir 34, and place it under a very high pressure which may be variably controlled, generally in the range between 10,000 and 30,000 psi, for discharge through a conduit 35. Mounted at the discharge end of the conduit 35 is the nozzle assembly 14 for directing a very high velocity, small diameter fluid jet toward the glass sheet S upon the support stand 13.

The nozzle assembly 14, as best illustrated in FIG. 2, may comprise a generally rectangular housing 36 having a threaded bore 37 at its upper end, the threaded bore being axially aligned with a flow passageway 38 extending through the housing. An externally threaded connector 39 having a flow passageway 40 extending therethrough, is suitably attached to the discharge end of the conduit 35 for connecting the conduit to the housing. A recess 41 is provided in a boss 42 at the threaded end of the connector 39, within which is mounted a fluid jet orifice 43 having a discharge opening 44 of very small diameter, for example, on the order of 0.014 inch (0.35 mm). When securely threaded in the bore 37, the connector 39 properly seats the orifice 43 in the upper, reduced diameter portion 45 of the flow passageway 38. The lower end of the passageway 38 includes an enlarged diameter portion 46 within which is received the end of a nozzle or mixing tube 47. The nozzle tube, to be hereinafter described in more detail, includes a relatively small diameter (e.g., 0.062 inch; 1.57 mm) longitudinally extending passageway 48 having an outwardly flared entrance opening 49 for readily receiving the jet stream from the orifice 43.

There is provided in the rectangular housing 36 an obliquely oriented passageway 50 for delivering abrasive material to the passageway 38 into the path of the fluid jet stream. The abrasive is carried in carefully regulated amounts from a storage container 51 and regulator 52 to the bore 50 by means of a flexible conduit or carrier tube 53. The abrasive material is aspirated into the fluid jet stream as the stream passes through the passageway 38, wherein it is mixed and accelerated into the high pressure stream prior to entering the passageway 48 in the nozzle tube 47.

In order to produce a cut edge of acceptable quality at a rapid rate by means of an abrasive fluid jet, it is imperative that a number of parameters in the procedure be properly correlated and controlled. Thus, it has been found that factors such as the type and particle or grit size of the abrasive material, type of fluid medium and degree to which it is pressurized, feed rate of the abrasive material, diameter of the orifice discharge opening 44, length and diameter of the passageway 48 in the nozzle tube 47, distance of the exit end of the nozzle tube from the glass surface, thickness of the glass, and rate of progression of the cutting jet along the glass, all interact and must be correlated in order to produce a cut of high quality at a suitable line speed. Such features are disclosed and discussed in detail in the aforementioned co-pending applications, of which is this is a continuation-in-part, and the disclosures of the earlier applications are specifically incorporated herein by reference.

Thus, the exit end of the nozzle tube 47 is generally positioned relatively close to the surface of the glass to be cut in order to control dispersion and overspray of the abrasive material onto the adjacent area of the glass and provide a minimum kerf of impingement-area width. A radius edge of sorts is produced on the cut glass surface when the nozzle-tube-to-glass stand-off distance, that is, the distance between the lower extremity of the nozzle tube and the glass surface, is excessive. While the resulting cut is formed with an entrant edge radius or curvature, the abrasive fluid jet disperses in an uncontrolled manner upon emerging from the nozzle tube, resulting in highly objectionable and damaging overspray onto the adjacent main body of the glass. With the present invention, the exit end of the nozzle tube is positioned closely adjacent the surface of the glass so that the abrasive fluid stream produces a cut with an entrant edge radius while the overspray is eliminated.

To that end as illustrated in FIGS. 2, 3 and 4, the passageway 48 of the nozzle tube 47 is provided at its exit end 54 with an outwardly flaring conical portion 55 similar to the flared opening 49 at the entrance end. The conical portion has tapered walls 56 joined to the bottom wall 57 of the tube through curved segments 58. By way of example, the nozzle tube 47 may have a total length of three inches (76.2 mm) and a diameter of 0.375 inch (9.52 mm), with the passageway 48 having a diameter from about 0.045 inch (1.14 mm) to 0.078 inch (1.98 mm), and preferably about 0.062 inch (1.57 mm). The walls 56 may diverge at an angle from about 5 to 15 degrees, and preferably about 7 degrees, from the longitudinal axis, and the conical portion 55 extends inwardly about 0.5 inch (12.7 mm) from the end of the nozzle tube. The diameter at the exit end of the passageway is thus on the order of three times that in the intermediate portion. The walls of the flared entrance opening diverge at a greater angle from the longitudinal axis, preferably on the order of 15 degrees, so that it has a depth about one half that of the conical portion 55. As indicated herein above as well as in the aforementioned copending applications, the nozzle tube 47 generally has a length on the order of 2 to 3 inches (50.8 to 76.2 mm). Thus, the length of the cylindrical portion of the passageway 48 is about two and one-half to four and one-half times that of the conical portion 55 thereof, while the length of the cylindrical portion is between about sixteen and fifty times, and preferably about thirty six times, its diameter.

As best shown in FIG. 3, the highly pressurized fluid containing the abrasive medium thus is directed into the passageway 48 from the orifice 43 through the flared entrance opening 49. In traversing the elongated passageway the fluid is formed into a highly collimated stream or jet, and as the collimated jet passes through the outwardly flaring conical portion 55 it tends to diverge somewhat while still being confined by the tapered side walls 56 until it emerges from the nozzle or mixing tube 47, whose bottom wall 57 is closely adjacent, for example, about 0.050 inch (1.27 mm) from the surface of the sheet S. The fluid jet thus disperses conically so that as the nozzle is moved over the sheet S along the desired path, the greatest concentration of abrasive particles is directed against the sheet along the longitudinal axis of the nozzle, while the number of abrasive particles striking the glass decreases toward the lateral sides of the cone. Consequently, when the nozzle assembly 14 is suitably moved along the glass by the carriage 28, the glass is severed along a narrow line 59, and the glass to either side of the line of severance is abraded by progressively decreasing amounts toward the lateral sides of the conical portion so that the cut edges are gently curved or rounded as shown at 60 in FIG. 3. Since the bottom wall 57 of the nozzle or mixing tube 47 is closely adjacent the surface of the glass, the abrasive jet is confined to the area beneath the nozzle and does not appreciably overspray onto the area at either side of the nozzle. The cut glass edge thus has a uniformly rounded, consistent appearance.

For certain end uses of the sheet S a curved corner edge at the entrant surface and a squared-off corner edge at the exit surface as shown in FIG. 3 may suffice. However, where both edge corners are required to be curved so as, for example, to produce an edge equivalent to a so-called No. 1 automotive edge achieved by belt edging, the sheet may be cut from both surfaces by means of the novel coned nozzle 47. In that event the sheet may be partially severed from one direction upon a first pass and then inverted for completion of the severing from the opposite direction upon a second pass. Both edges of the cut will then be curved to create a rounded automotive-type edge. Alternatively, as illustrated in FIG. 4, the sheet may be completely severed as in FIG. 3, with the sheet then being inverted and the cut edge subjected to cutting in the opposite direction to form a second rounded edge 61 on the cut surface.

In order to achieve greater rounding of the cut surface, that is, to increase the radius of the curved surface, the nozzle tube 47 may be positioned at an angle to the glass surface transverse to the cutting path. Thus, the glass can be successfully severed with the nozzle at an angle of 30 degrees or more from perpendicular to the glass surface, although a preferred angle is on the order of 15 degrees from perpendicular. In a trial a sheet of 0.156 inch (3.96 mm) thick glass severed in accordance with the invention, with the abrasive fluid jet directed at an angle of 15 degrees from perpendicular, and then inverted and cut at the same angle from the opposite surface, had more gently rounded corners, with a slight crown at the center of the cut edge, than glass similarly treated with the fluid jet directed normal to the glass surface.

It is to be understood that the forms of the invention herewith shown and described are to be taken as illustrative embodiments only of the same, and that various changes in the shape, size and arrangement of parts may be resorted to without departing from the spirit of the invention.

We claim:

1. A method of forming a rounded edge in cutting a glass sheet along a desired path with an abrasive liquid jet, comprising advancing the liquid jet in which abrasive particles are entrained through an elongated cylindrical passageway to collimate said liquid jet, discharging said collimated liquid jet closely adjacent said sheet, allowing said liquid jet to diverge within confined limits immediately prior to being discharged against said sheet, the distance said liquid jet travels through said cylindrical passageway being at least two and one-half times the distance traversed in diverging within confined limits, and moving said liquid jet and said sheet relative to one another along the desired path for the cut.

2. A method of forming a rounded edge in cutting glass sheets with an abrasive liquid jet as claimed in claim 1, wherein said liquid jet diverges conically within said confined limits.

3. A method of forming a rounded edge in cutting glass sheets with an abrasive liquid jet as claimed in claim 2, wherein said liquid jet is allowed to diverge at an angle in the range from about 5 degrees to 15 degrees from the longitudinal axis of said jet.

4. A method of forming a rounded edge in cutting glass sheets with an abrasive liquid jet as claimed in claim 3, wherein the diameter of the abrasive jet striking said sheet is about three times the diameter of the collimated jet prior to divergence.

5. A method of forming a rounded edge in cutting glass sheets with an abrasive liquid jet as claimed in claim 2, wherein said liquid jet is discharged against said sheet at a distance not greater than about 0.050 inch (1.27 mm) from said sheet.

6. A method of forming a rounded edge in cutting glass sheets with an abrasive liquid jet as claimed in claim 2, wherein said collimated liquid jet has a diameter in the range from about 0.045 to 0.078 inch (1.14 to 1.98 mm).

7. A method of forming a rounded edge in cutting glass sheets with an abrasive fluid jet as claimed in claim 5, wherein said fluid jet is allowed to diverge at an angle of about 7 degrees from the longitudinal axis of said jet, said jet having a diameter of about 0.062 inch (1.57 mm) prior to divergence and 0.185 inch (4.69 mm) as it is discharged against said sheet.

8. In apparatus for forming a rounded edge on glass sheets as they are cut along a desired path by an abrasive liquid jet including means supporting a glass sheet to be cut, a nozzle assembly for directing a liquid jet against the sheet, means supplying liquid under pressure to the nozzle assembly, means entraining abrasive particles in the liquid jet, and means moving the nozzle assembly and glass sheet relative to one another whereby the liquid jet follows said desired path of cut along the sheet, the improvement comprising a nozzle tube for said nozzle assembly having entrance and exit ends and including interior walls defining an elongated longitudinally extending passageway therethrough, said passageway including a cylindrical portion for collimating said liquid jet, the walls of said passageway flaring conically outwardly at an angle between about 5 degrees and 15 degrees to the longitudinal axis of said passageway at said exit end, and the length of said cylindrical portion being at least two and one-half times that of the outwardly flaring end portion.

9. Apparatus for forming a rounded edge on glass sheets as they are cut by an abrasive liquid jet as claimed in claim 8, wherein said passageway has a diameter between about 0.045 and 0.078 inch (1.14 to 1.98 mm).

10. Apparatus for forming a rounded edge on glass sheets as they are cut by an abrasive liquid jet as claimed in claim 8, wherein the exit end of said nozzle tube is not greater than about 0.050 inch (1.27 mm) from the surface of said sheet whereby said jet is prevented from overspraying onto the adjacent glass surface.

11. Apparatus for forming a rounded edge on glass sheets as they are cut by an abrasive liquid jet as claimed in claim 10, wherein said elongated passageway has a diameter of about 0.062 inch (1.57 mm), the walls of said passageway diverge in the conical portion at an angle of about 7 degrees to the longitudinal axis of said passageway, and said passageway has a diameter of about 0.185 inch (4.69 mm) at the exit end.

12. Apparatus for forming a rounded edge on glass sheets as they are cut by an abrasive liquid jet as claimed in claim 8, wherein said nozzle tube has a planar bottom wall and said conically diverging walls of said passageway are connected by a curved segment to said planar bottom wall of said nozzle tube.

13. A nozzle tube for forming a rounded cut edge in the abrasive liquid jet cutting of glass sheets, comprising an elongated cylindrical body having entrance and exit ends and interior walls defining a passageway extending axially therethrough from the entrance end to the exit end thereof, said passageway including a cylindrical portion for transmitting and collimating the liquid jet, the walls of said passageway diverging at an angle between about 5 degrees and 15 degrees to the longitudinal axis of said passageway to form an inverted conical section at the exit end of said passageway whereby the collimated liquid jet diverges within the conical section before being discharged against said sheets, the length of said cylindrical portion being at least two and one-half times that of said conical section.

14. A nozzle tube for forming a rounded cut edge in the abrasive liquid jet cutting of glass sheets as claimed in claim 13, including outwardly diverging walls defining a conical section at the entrance end of said passageway.

15. A nozzle tube for forming a rounded cut edge in the abrasive liquid jet cutting of glass sheets as claimed in claim 13, wherein said passageway has a diameter of about 0.062 inch (1.57 mm), said walls of said passageway diverge at an angle of about 7 degrees from the axis of said passageway to form said inverted conical section, and said passageway has a diameter of about 0.185 inch (4.69 mm) at its exit end.

16. A method as claimed in claim 1, wherein the distance said liquid jet travels through said cylindrical passageway is about four and one-half times the distance traversed in diverging within confined limits.

17. A method as claimed in claim 1, wherein the length of said cylindrical passageway through which said liquid jet advances is at least sixteen times its diameter.

18. A nozzle tube as claimed in claim 13, wherein the length of said cylindrical portion is about four and one-half times that of said outwardly flaring end portion.

19. A nozzle tube as claimed in claim 13, wherein the length of said cylindrical portion for transmitting end collimating said liquid jet is at least sixteen times its diameter.

* * * * *

UNITED STATES PATENT AND TRADEMARK OFFICE
CERTIFICATE OF CORRECTION

PATENT NO. : 4,711,056

DATED : December 8, 1987

INVENTOR(S) : Richard A. Herrington, Thomas G. Kleman and Ermelinda A. Apolinar

It is certified that error appears in the above-identified patent and that said Letters Patent are hereby corrected as shown below:

On the title page, in the section headed "Related U.S. Application Data", after "abandoned" insert --; and a continuation-in-part of Ser. No. 747,937, June 24, 1985, Pat. No. 4,703,591, Ser. No. 723,578, April 15, 1985, Pat. No. 4,702,042, and Ser. No. 654,975, September 27, 1984, Pat. No. 4,656,791--.

Signed and Sealed this

Twenty-sixth Day of April, 1988

Attest:

DONALD J. QUIGG

Attesting Officer

Commissioner of Patents and Trademarks